(12) United States Patent
Kroes

(10) Patent No.: US 7,613,019 B2
(45) Date of Patent: *Nov. 3, 2009

(54) METHOD AND APPARATUS TO LIMIT MAXIMUM SWITCH CURRENT IN A SWITCH OF A SWITCHING POWER SUPPLY

(75) Inventor: Derek J. Kroes, Fremont, CA (US)

(73) Assignee: Power Integrations, Inc., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 11/177,096

(22) Filed: Jul. 8, 2005

(65) Prior Publication Data

US 2007/0008753 A1   Jan. 11, 2007

(51) Int. Cl.
*H02H 7/122* (2006.01)
*G05F 1/00* (2006.01)

(52) U.S. Cl. ............... 363/56.03; 323/284; 323/908

(58) Field of Classification Search .......... 363/21.13, 363/21.17, 56.03, 56.09, 21.12, 21.18, 56.12, 363/95, 97; 323/222, 284, 908
See application file for complete search history.

(56) References Cited

U.S. PATENT DOCUMENTS

| | | | |
|---|---|---|---|
| 4,616,301 A | | 10/1986 | Small |
| 4,716,510 A | * | 12/1987 | Pace et al. .................... 363/49 |
| 4,791,544 A | | 12/1988 | Gautherin et al. |
| 4,928,200 A | | 5/1990 | Redl et al. |
| 5,088,016 A | | 2/1992 | Vinciarelli et al. |
| 5,164,659 A | * | 11/1992 | Schultz et al. .............. 323/351 |
| 5,229,707 A | * | 7/1993 | Szepesi et al. .............. 323/222 |
| 5,335,162 A | * | 8/1994 | Martin-Lopez et al. ....... 363/97 |
| 5,825,234 A | * | 10/1998 | Sung et al. .................. 327/378 |
| 6,011,706 A | * | 1/2000 | Adragna et al. .............. 363/41 |
| 6,061,257 A | * | 5/2000 | Spampinato et al. ...... 363/21.13 |
| 6,151,226 A | | 11/2000 | Chen et al. |
| 6,788,038 B1 | | 9/2004 | Bell et al. |
| 6,788,555 B2 | * | 9/2004 | Bourdillon et al. ........ 363/21.14 |

(Continued)

OTHER PUBLICATIONS

Texas Instruments Incorporated, "UC1825/UC2825/UC3825, High Speed PWM Controller," SLUS235A, pp. 1-8 and addendum, Mar. 1997, Revised Mar. 2004.

(Continued)

*Primary Examiner*—Jessica Han
*Assistant Examiner*—Emily Pham
(74) *Attorney, Agent, or Firm*—Blakely, Sokoloff Taylor & Zafman LLP

(57) ABSTRACT

Techniques are disclosed to limit the current in a switch of a switching power supply. An example switching regulator circuit includes a switch to be coupled to an energy transfer element. A controller is coupled to the switch to control switching of the switch. A current sensor is included in the controller. The current sensor includes first and second comparators coupled to compare a current in the switch with first and second current limits, respectively. The controller is to open the switch for a remainder of a current switching cycle of the switch until a next switching cycle of the switch in response to the first or second comparators. A frequency adjuster is also included in the controller and coupled to the second comparator. The frequency adjuster is to adjust an oscillating frequency of an oscillator included in the controller in response to the second comparator.

23 Claims, 6 Drawing Sheets

U.S. PATENT DOCUMENTS

| | | |
|---|---|---|
| 6,914,789 B2 | 7/2005 | Kinoshita et al. |
| 6,980,444 B2 | 12/2005 | Takahashi |
| 7,054,171 B1 * | 5/2006 | Bailly et al. ............. 363/21.08 |
| 7,161,815 B2 | 1/2007 | Mori |
| 7,239,532 B1 | 7/2007 | Hsu et al. |
| 2003/0062879 A1 | 4/2003 | Balakrishnan et al. |
| 2003/0156433 A1 | 8/2003 | Gong et al. |
| 2005/0030776 A1 * | 2/2005 | Lin ............................. 363/98 |
| 2006/0007714 A1 * | 1/2006 | Hua ............................ 363/24 |
| 2006/0056204 A1 * | 3/2006 | Yang et al. .................... 363/10 |
| 2006/0077697 A1 | 4/2006 | Yang |
| 2007/0008756 A1 * | 1/2007 | Djenguerian et al. .......... 363/95 |

OTHER PUBLICATIONS

EP 06 25 3518—EP Search Report, dated Mar. 20, 2008 (Publication No. EP 1 474 442 A2).

* cited by examiner

METHOD AND APPARATUS TO LIMIT MAXIMUM SWITCH CURRENT IN A SWITCH OF A SWITCHING POWER SUPPLY

BACKGROUND

1. Technical Field

The present invention relates generally to electronic circuits, and more specifically, the invention relates to switched mode power supplies.

2. Background Information

Switches in switching power supplies can sustain damage from excess voltage, excess current, or particular combinations of voltage and current. The instantaneous voltage and current must remain within a boundary defined as the safe operating area to prevent damage to the switch. Therefore, controllers for switching power supplies usually measure voltage and current for the purpose of protecting the switch as well as for regulating an output.

Conflicting requirements and limitations of real devices often make it impossible or impractical for controllers to measure the quantities necessary to protect the switch under all conditions. Whereas maximum voltage on the switch can usually be deduced from a simple measurement of the dc input voltage, measurement of the current in the switch is usually much more difficult.

Controllers typically must mask the measurement of switch current at certain times in the switching period to avoid false indications of excess current. Moreover, there will always be some delay between the detection of excess current and an appropriate response. Thus, conventional methods may be unable to protect the switch from damage under certain conditions of transient loading or faults.

BRIEF DESCRIPTION OF THE DRAWINGS

The present invention detailed illustrated by way of example and not limitation in the accompanying Figures.

DETAILED DESCRIPTION

Embodiments of a power supply regulator that may be utilized in a power supply are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "for one embodiment" or "in an embodiment" in various places throughout this specification are not necessarily all referring to the same embodiment. Furthermore, the particular features, structures, or characteristics may be combined in any suitable manner in one or more embodiments.

During start-up or overload when the power supply has a low output voltage, traditional techniques that respond to excessive current in the power switch cannot prevent the current from going higher in each switching period while allowing the power supply to operate because leading edge blanking time and current limit delay time impose a minimum on time of the switch. Moreover, the controller responds to the low output voltage with a minimum off time for the current to decrease. Techniques are disclosed that use multiple current limit values to determine the need to engage an alternative control mode that extends the off time of the switch to allow the current to decrease to a safe value. Therefore, techniques are disclosed to prevent excess current in a switch of a switching power supply. For one embodiment, switch current is measured against multiple current limit values to recognize a condition of uncontrolled increasing current. Recognition of uncontrolled increasing current engages an alternative control action that delays the start of subsequent switching periods.

Figure 1:
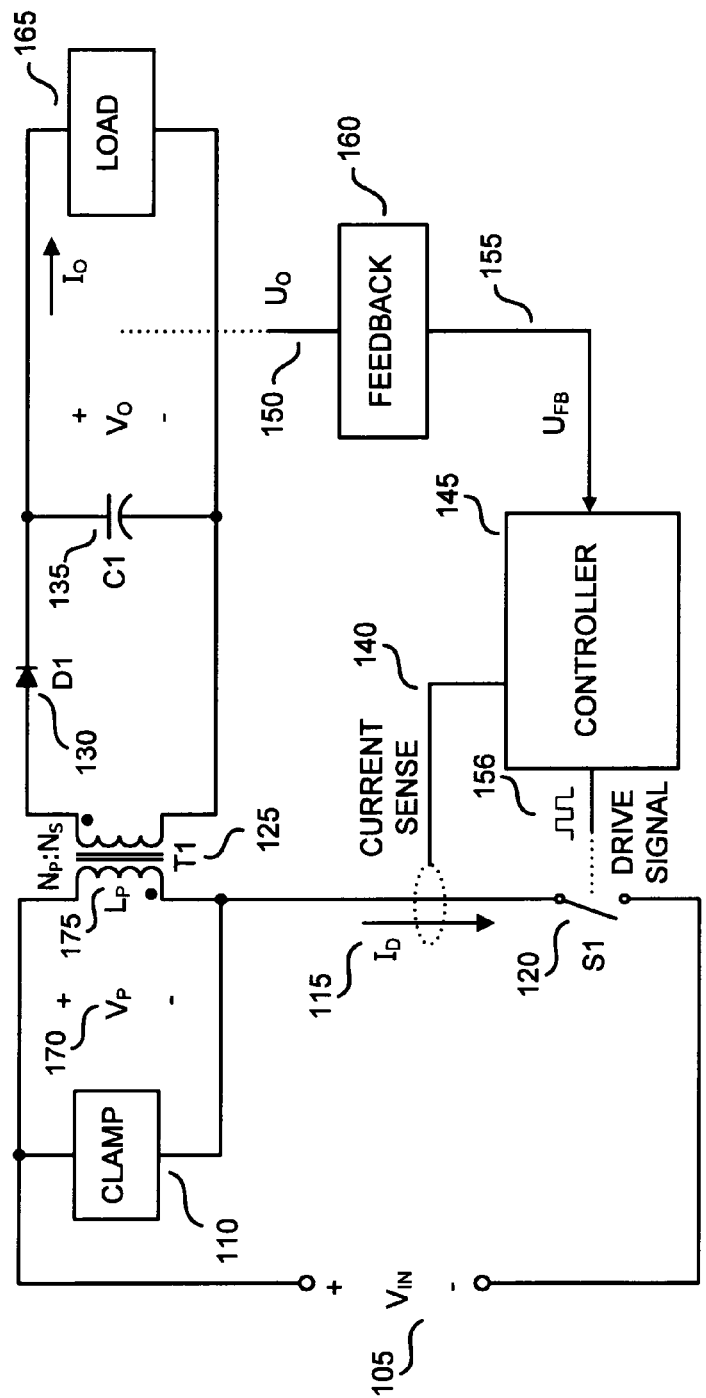
FIG. 1 is a functional block diagram of one embodiment of a switching power supply that may limit peak current in a power switch in accordance with the teaching of the present invention.
Figure 1:
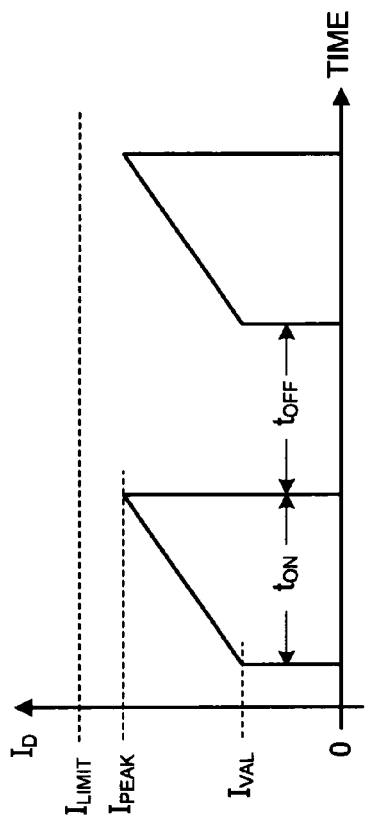

To illustrate, FIG. 1 shows generally a functional block diagram of a power supply for an embodiment of a power supply that limits peak switch current in accordance with the teachings of the present invention. The topology of the example power supply illustrated in FIG. 1 is a flyback regulator. It is appreciated that there are many topologies and configurations of switching regulators, and that the flyback topology shown in FIG. 1 is provided for explanation purposes and that other types of topologies may also be employed in accordance with the teachings of the present invention. Furthermore, it is noted that although various embodiments of the present invention are described herein in the context of a power supply for explanation purposes, it is appreciated that the teachings of the present invention may also apply to other technologies such as for example other applications that may involve inductive load switching or the like.

As illustrated in the power supply example of FIG. 1, an energy transfer element T1 125 is coupled between an unregulated input voltage $V_{IN}$ 105 and a load 165 at an output of the power supply. A switch S1 120 is coupled to the primary winding 175 at an input of energy transfer element 125 to regulate the transfer of energy from the unregulated input voltage $V_{IN}$ 105 to the load 165 at the output of the power supply. A controller 145 is coupled to generate a drive signal 156 that is coupled to be received by the switch S1 120 to control switching of switch S1 120. Controller 145 also includes a current sensor coupled to receive current sense 140 that senses a current $I_D$ 115 in switch S1 120.

As will be discussed below, the current sensor in controller 145 for one embodiment includes first and second comparators coupled to compare the current $I_D$ 115 with first and second current limits, respectively. The second current limit is greater than the first current limit. For one embodiment, the controller 145 will cause drive signal 156 to open the switch S1 120 for the remainder of the current switching cycle of the switch until the beginning of the next switching cycle of the switch if the current $I_D$ 115 is greater than the first or second current limits. For one embodiment, the controller 145 also includes a frequency adjuster coupled to the second comparator. The frequency adjuster will adjust an oscillating frequency of an oscillator included in the controller to delay the next switching cycle of the switch if the current $I_D$ 115 is greater than the second current limit in accordance with the teachings of the present invention.

In the example of FIG. 1, the energy transfer element T1 125 is illustrated as a transformer with two windings. A primary winding 175 has $N_P$ turns with an inductance $L_P$. A secondary winding has $N_S$ turns. In general, the transformer can have more than two windings, with additional windings to provide power to additional loads, or to provide bias voltages, or to sense the voltage at a load, or the like.

A clamp circuit 110 is coupled to the primary winding 175 of the energy transfer element T1 125 to control the maximum voltage on the switch S1 120. As mentioned, switch S1 120 is switched on and off in response to a drive signal 156 generated by a controller circuit 145. For one embodiment, switch S1 120 is a transistor such as for example a power metal oxide semiconductor field effect transistor (MOSFET). For one embodiment, controller 145 includes integrated circuits and discrete electrical components. The operation of switch S1 120 produces pulsating current in the rectifier D1 130 that is filtered by capacitor C1 135 to produce a substantially constant output voltage $V_O$ or a substantially constant output current $I_O$ at the load 165.

The output quantity to be regulated is $U_O$ 150, that in general could be an output voltage $V_O$, an output current $I_O$, or a combination of the two. A feedback circuit 160 is coupled to the output quantity $U_O$ 150 to produce a feedback signal $U_{FB}$ 155 that is an input to the controller 145. Another input to the controller 145 is the current sense signal 140 that senses a current $I_D$ 115 in switch S1 120. Any of the many known ways to measure a switched current, such as for example a current transformer, or for example the voltage across a discrete resistor, or for example the voltage across a transistor when the transistor is conducting, may be used to measure current $I_D$ 115. The controller may use current sense signal 140 to regulate the output $U_O$ 150 or to prevent damage to the switch S1 120.

FIG. 1 also illustrates an example waveform for current $I_D$ 115 through switch S1 120 under ideal conditions. The switch S1 120 conducts for a time $t_{ON}$ in response to a pulse in the drive signal 156 from controller 145. Switch S1 120 is open for an off time $t_{OFF}$ in response to the drive signal 156 from controller 145. During the time of conduction $t_{ON}$, the current increases linearly with time from an initial current $I_{VAL}$ to a final current $I_{PEAK}$ in response to the input voltage $V_{IN}$ 105 that is imposed across the inductance $L_P$ of the primary winding 175 of the transformer T1 125 when the switch S1 120 is conducting.

For one embodiment, controller 145 operates switch S1 120 to substantially regulate the output $U_O$ 150 to its desired value. For one embodiment, controller 145 increases conduction time $t_{ON}$ of the switch S1 120 when output $U_O$ 150 is less than its desired value. For one embodiment, controller 145 decreases conduction time $t_{ON}$ of the switch S1 120 when output $U_O$ 150 is greater than its desired value.

For one embodiment, controller 145 adjusts the operation of the switch S1 120 with the drive signal 156 to prevent operation outside its safe operating area. For one embodiment, controller 145 reduces conduction time $t_{ON}$ of the switch S1 120 when current $I_D$ 115 exceeds a current limit $I_{LIMIT}$. For one embodiment, controller 145 increases off time $t_{OFF}$ when current $I_D$ 115 exceeds a current limit $I_{LIMIT}$.

Figure 2:
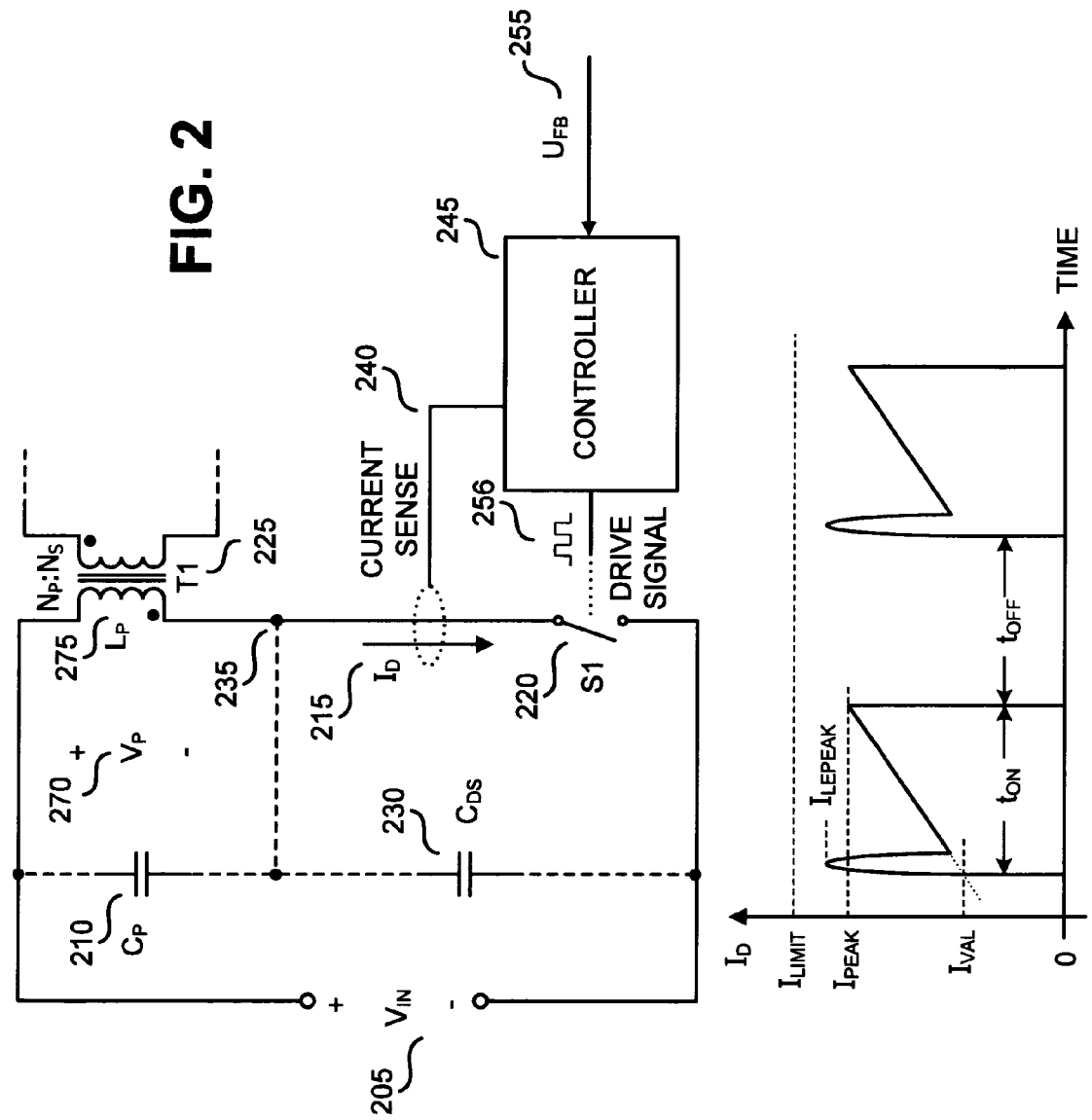
FIG. 2 is a section of a functional block diagram of one embodiment of a switching power supply that shows the contribution of parasitic capacitance to the current in the power switch.
Figure 3:
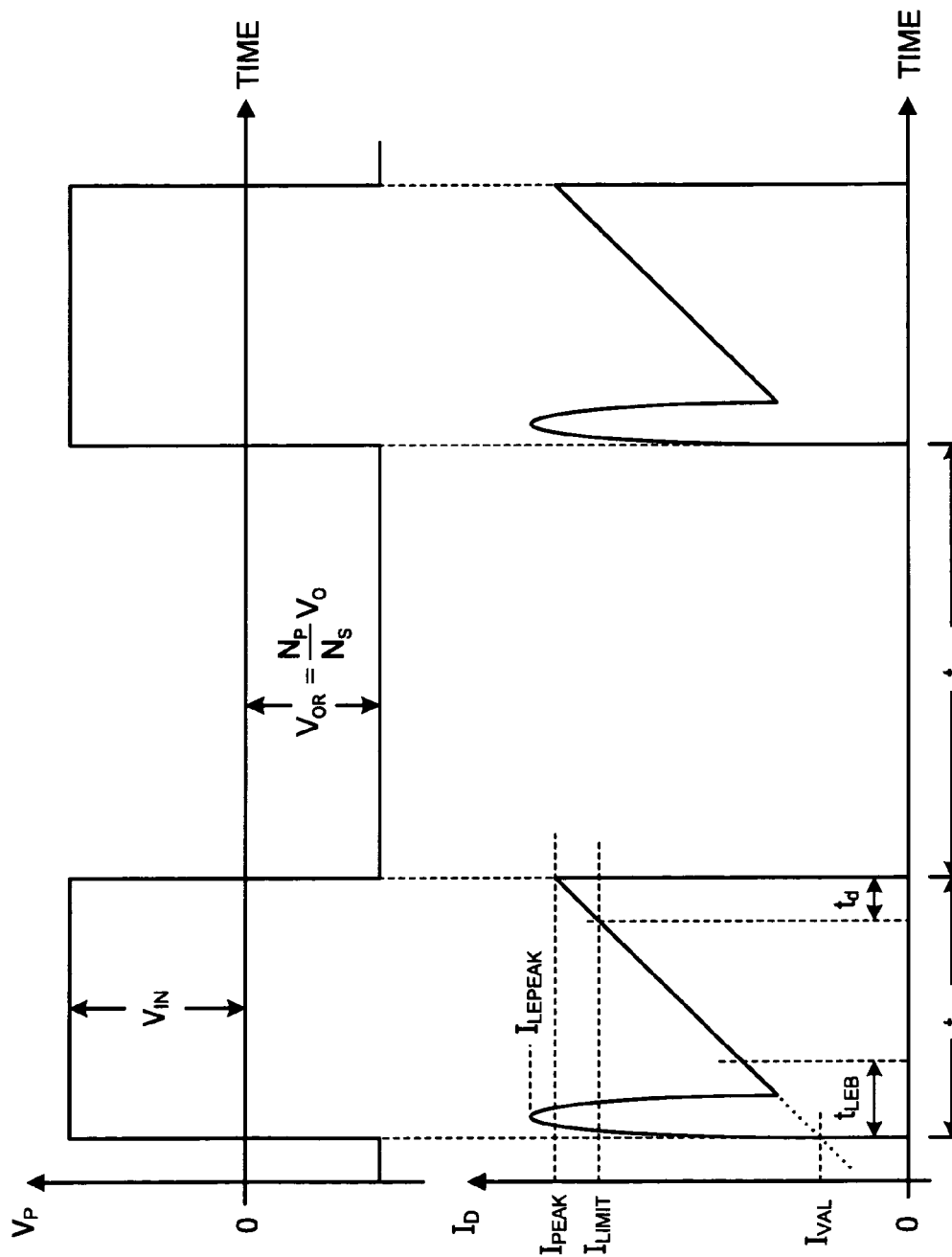
FIG. 3 shows voltage and current waveforms from one embodiment of a switching power supply that may limit peak current in a power switch in accordance with the teaching of the present invention.

FIG. 2 shows the contribution of stray capacitance to the current $I_D$ 215 that is measured in switch S1 220. Charging and discharging of stray capacitance represented by capacitors $C_P$ 210 and $C_{DS}$ 230 coupled to switch S1 at node 235 augments the current $I_D$ 215 for a short time after switch S1 220 turns on. FIG. 2 also shows the voltage $V_P$ 270 on inductance $L_P$ of primary winding 275 of transformer T1 225. For one embodiment, voltage $V_P$ is positive with magnitude $V_{IN}$ during the on time $t_{ON}$. For one embodiment, voltage $V_P$ is negative with magnitude $V_{OR}$ during the off time $t_{OFF}$. The abrupt reversal of polarity in voltage $V_P$ adds a leading edge current to the initial current $I_{VAL}$ of switch S1 220. The waveforms in FIG. 2 show a peak leading edge current $I_{LEPEAK}$ that is greater than the ideal initial current $I_{VAL}$. For one embodiment, the peak leading edge current $I_{LEPEAK}$ is also greater than final current $I_{PEAK}$. The stray capacitance that is present in every practical circuit can produce a high leading edge current that can interfere with the ability of a controller to regulate an output or to protect a switch. A controller that responds to the magnitude of switch current $I_D$ 215 to regulate an output or to protect a switch would also respond to the leading edge current that is not significantly related to the regulation of the output or to the safe operation of the switch. To avoid interference from leading edge current, controllers typically mask the measurement of current in the switch until after a leading edge blanking time $t_{LEB}$. The relationship of leading edge blanking time $t_{LEB}$ to the conduction time $t_{ON}$ is shown in FIG. 3.

The leading edge blanking time $t_{LEB}$ is long enough to guarantee that the contribution of current from stray capacitance is negligible before the current $I_D$ becomes visible to the controller. FIG. 3 also shows current limit delay time $t_d$ that is the difference between the time $I_D$ reaches $I_{LIMIT}$ after $t_{LEB}$ and the time when the switch stops conducting. Current limit delay time $t_d$ is always present because practical circuits cannot respond instantaneously. Finite current limit delay time $t_d$ has a consequence of peak current $I_{PEAK}$ at the end of conduction time $t_{ON}$ being greater than current limit $I_{LIMIT}$.

Figure 4:
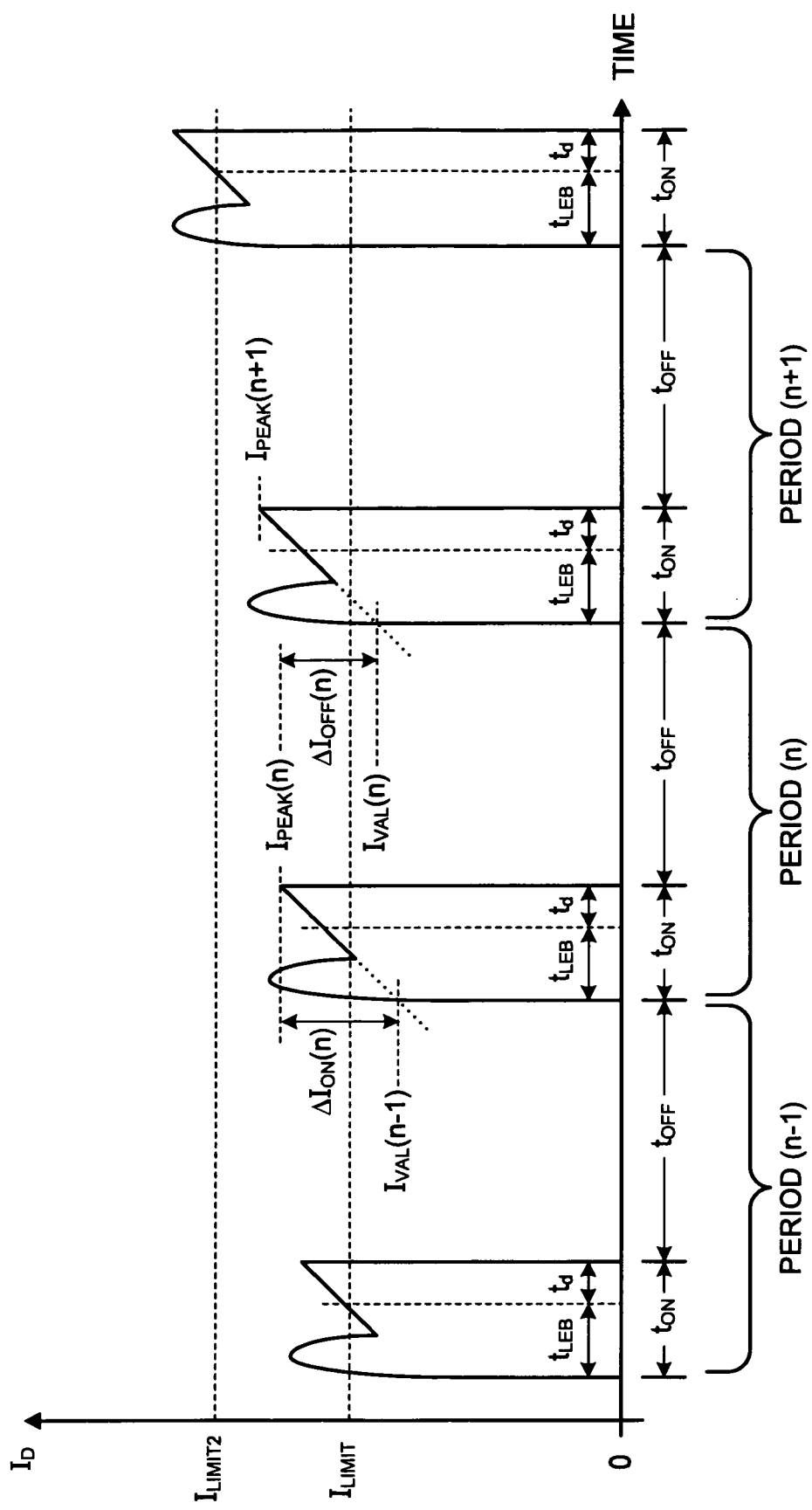
FIG. 4 illustrates important parameters of current waveforms from a switching power supply that limits peak current in a power switch in accordance with the teaching of the present invention.

Leading edge blanking time $t_{LEB}$ and current limit delay $t_d$ can make it impossible for typical controllers to limit the switch current $I_D$. FIG. 4 illustrates an undesirable situation that can occur in a switching power supply with a typical controller when the output is less than its regulated value. In FIG. 4, an overload at the output causes the switch current $I_D$ to exceed $I_{LIMIT}$ in every switching period. The overload has also caused the output voltage $V_O$ to drop far below its regulated value. The controller measures switch current $I_D$ at the end of leading edge blanking time $t_{LEB}$, and the switch opens after current limit delay time $t_d$. The detection of $I_D$ greater than $I_{LIMIT}$ cannot reduce the on time $t_{ON}$ below the sum of $t_{LEB}$ plus $t_d$.

FIG. 4 shows that in any switching period (n), the current that appears as switch current $I_D$ during the on time (exclusive of any current from parasitic capacitance) increases by amount $\Delta I_{ON}$ during the on time to reach $I_{PEAK}$, and then decreases from $I_{PEAK}$ by an amount $\Delta I_{OFF}$ during the off time. The changes in current are related to the input and output voltages by Equation 1 and Equation 2.

$$\Delta I_{ON} = \frac{V_{IN} t_{ON}}{L_P} = \frac{V_{IN}(t_{LEB} + t_d)}{L_P} \qquad \text{Equation 1}$$

$$\Delta I_{OFF} = \frac{V_{OR} t_{OFF}}{L_P} = \left(\frac{N_P}{N_S}\right)\frac{V_O t_{OFF}}{L_P} \qquad \text{Equation 2}$$

It is clear from FIG. 4 that when $\Delta I_{ON} > \Delta I_{OFF}$ for every consecutive pulse or switching period, the peak current of the next switching period (n+1) will be greater than the peak current in the present switching period (n). An overload condition that reduces the output voltage $V_O$ substantially below its regulated value will cause the control circuit to make the off time $t_{OFF}$ as small as possible. Equation 2 shows that reduction of $V_O$ with constant or reduced $t_{OFF}$ will reduce $\Delta I_{OFF}$. Equation 1 shows that the leading edge blanking time $t_{LEB}$ and the current limit delay time $t_d$ impose a minimum value on $\Delta I_{ON}$. Therefore, the usual method of control will allow $\Delta I_{ON}$ to be greater than $\Delta I_{OFF}$ during an overload of the output. When $\Delta I_{ON}$ is greater than $\Delta I_{OFF}$, the current and voltage can go outside the safe operating area of the switch after only a few consecutive switching periods. Fault detection circuits that respond only after many switching periods are unable to protect the switch from failure. The controller must respond within a small number of switching periods to keep the operation of the switch within its safe operating area.

Figure 5:
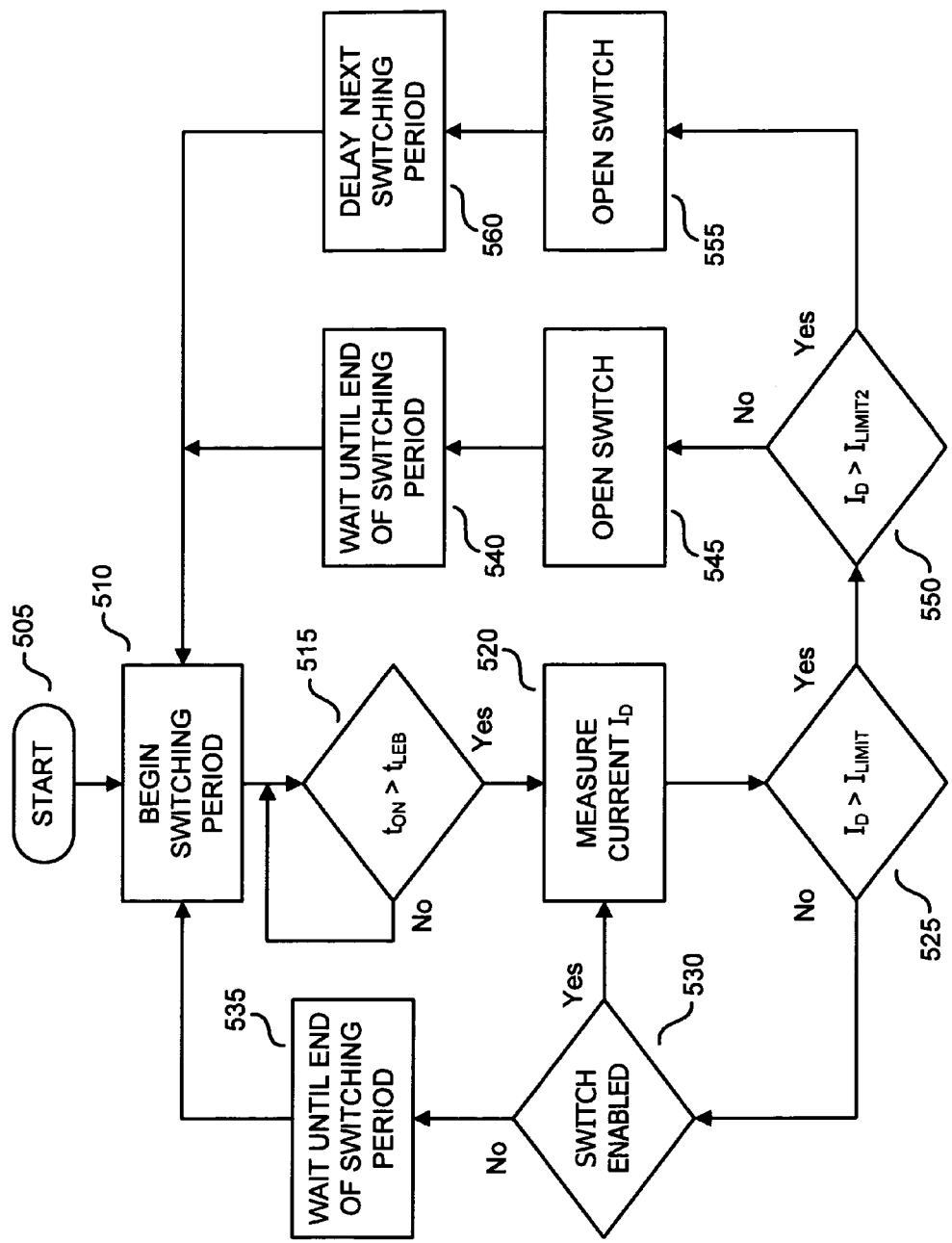
FIG. 5 is a flow diagram that illustrates a method to limit peak current in a power switch in accordance with the teaching of the present invention.

FIG. 5 is a flow diagram that describes one example method to keep the operation of the switch within its safe operating area in accordance with the teachings of the present invention. With reference to the example waveforms of FIG. 4, the illustrated method measures whether or not $I_D$ has exceeded a second current limit $I_{LIMIT2}$, which is greater than a first current limit $I_{LIMIT}$, to determine whether or not an alternative control action is to be performed to help prevent the peak switch current $I_{PEAK}$ from becoming excessive. In the example described in FIG. 5, there is an alternative control action if $I_D$ is greater than $I_{LIMIT2}$ at any time during a switching period except during the leading edge blanking time $t_{LEB}$ after the start of the period. The alternative control action opens the switch and delays the start of the next switching period. For one embodiment, the alternative control action reduces the frequency of an oscillator to effectively lengthen the switching period to delay the start of the next switching period. In one embodiment, detection of current $I_D$ greater than $I_{LIMIT2}$ sets a flag that is reset by a switching period that is not lengthened. If there is a detection of $I_D$ greater than $I_{LIMIT2}$ while the flag is set (two consecutive periods with a detection of $I_D$ greater than $I_{LIMIT2}$), then there is an extra lengthening of the period such that the second lengthened switching period is longer than the first lengthened switching period. The alternative control actions provide uninterrupted regulation of the output in contrast to other protective actions that cause the output to lose regulation, such as for example latching the power supply off or entering an auto-restart mode of operation.

In particular, processing in Figure begins at block 505 and then proceeds to block 510 where a switching period begins. At block 515, processing waits until the on time $t_{ON}$ has been on at least the leading edge blanking time $t_{LEB}$. At block 520, the current $I_D$ through the switch is measured. Block 525 in conjunction with block 530 show that while the current $I_D$ is not greater than $I_{LIMIT}$ and while the switch is enabled, the current $I_D$ through the switch is measured in block 520. If the current $I_D$ remains not greater than $I_{LIMIT}$ until the end of the switching period is indicated in block 535, processing then returns to block 510 where the next switching period then begins.

However, if the current $I_D$ reaches a value greater than the current limit $I_{LIMIT}$, then both blocks 545 and 555 show that the switch is opened for the remainder of the current switching cycle and will not be closed again until the beginning of the next switching cycle. For one embodiment, the switch is opened asynchronously or substantially immediately such that the current switching cycle is not allowed to be completed normally. Referring back to FIG. 5, block 550 shows that it is next determined whether the current $I_D$ reaches the greater second current limit $I_{LIMIT2}$. If not, then at block 545 the switch is opened for the remainder of the current switching cycle until the end of the switching period or until the next switching cycle, as indicated at block 540. Processing then returns to block 510 to begin the next switching period or cycle. If it is determined at block 550 that current $I_D$ reaches the second current limit $I_{LIMIT2}$, then the switch is opened at block 555 and the beginning of the next switching period is delayed at block 560 in accordance with the teachings of the present invention. After the delay of block 560, processing then returns to block 510 to begin the next switching period. By waiting the extra time provided during the extra delay in block 560, the current $I_D$ is given a chance to decrease sufficiently to help limit the maximum current $I_D$ through the switch and help prevent the current and/or voltage at switch from going outside the safe operating area in accordance with the teachings of the present invention.

Figure 6:
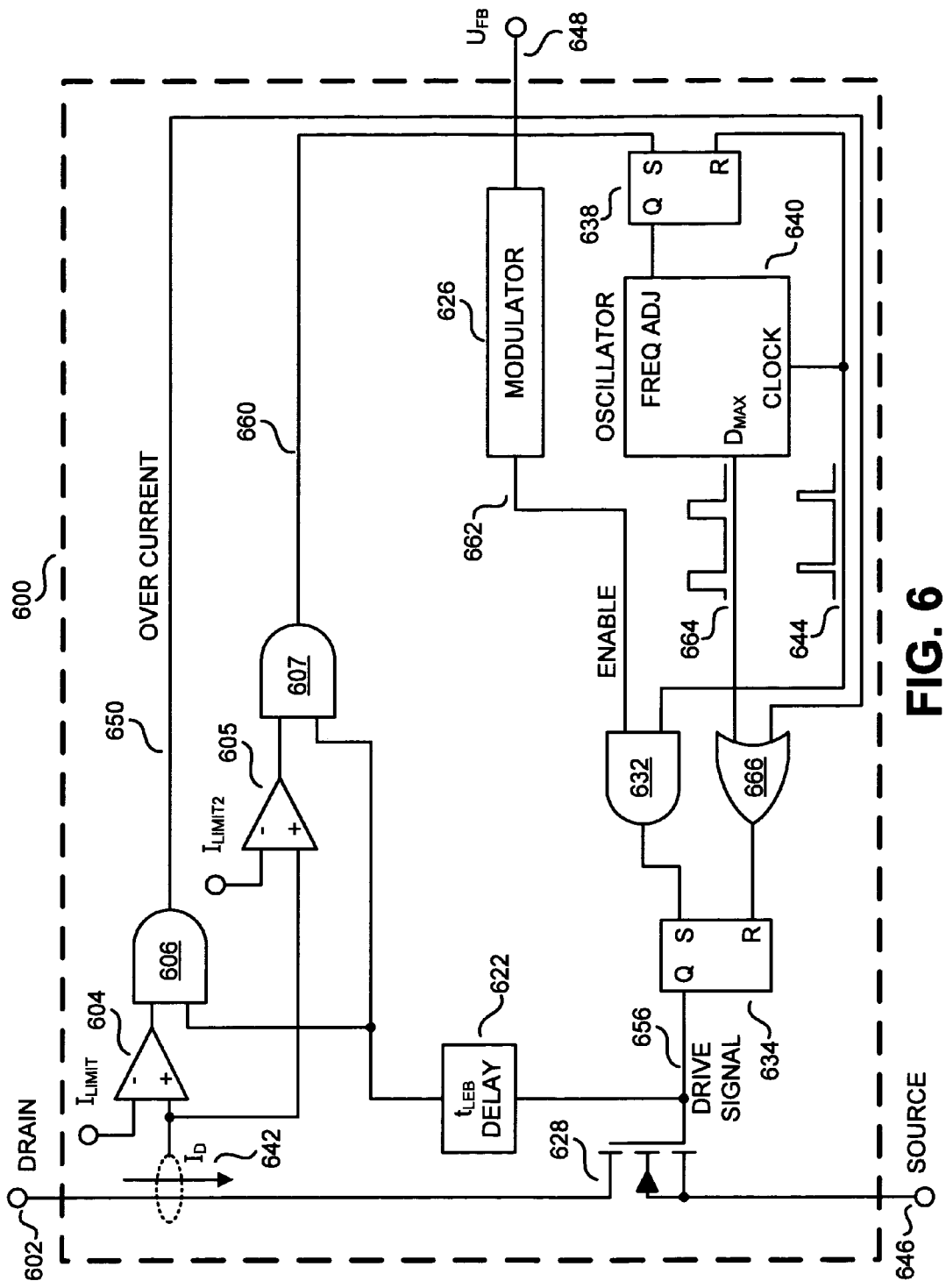
FIG. 6 is a functional block diagram of an integrated circuit that limits peak current in an included power switch in accordance with the teachings of the present invention.

FIG. 6 shows one example of a method according to the teachings of the present invention implemented in an example integrated circuit 600. In the illustrated example, integrated circuit 600 includes power metal oxide semiconductor field effect transistor (MOSFET) switch 628 that is coupled to a drain terminal 602 and a source terminal 646. A terminal 648 receives a feedback signal $U_{FB}$. For one embodiment, integrated circuit 600 may optionally include one or more other terminals that receive signals and perform functions that are not described in this example.

In the example of FIG. 6, a modulator 626 interprets the feedback signal $U_{FB}$ from terminal 648 to determine whether an enable signal 662 should be high or low. An oscillator 640 provides a clock signal 644 and a maximum on-time signal $D_{MAX}$ 664. In the illustrated example, the oscillator 640 includes a FREQ ADJ terminal coupled to an output of latch 638. For one embodiment, the frequency of oscillator 640 changes from a higher frequency to a lower frequency in response to the output of latch 638. Switch 628 responds to a drive signal 656 generated at the output of a latch 634, which receives signals from AND gate 632 and OR gate 666. Switch 628 is on if both clock 644 and enable 662 are high while both $D_{MAX}$ 644 and OVER CURRENT 650 are low. Switch 628 is off if either $D_{MAX}$ 664 or OVER CURRENT 650 is high.

In the example of FIG. 6, a current sensor or current limiting circuit according the teachings of the present invention is realized with comparators 604 and 605 as shown. In particular, one of the terminals of comparator 604 is coupled to sense the current $I_D$ through switch 628 and compare it to the first current limit $I_{LIMIT}$, which is coupled to the other terminal of comparator 604. AND gate 606 is coupled to receive the output of comparator 604 and $t_{LEB}$ DELAY 622. Whenever $I_D$ exceeds $I_{LIMIT}$ after the blanking time delay $t_{LEB}$, the output of AND gate 606 goes high to reset latch 634 through OR gate 666 to turn off switch 628. In the illustrated example, comparator 605 is shown to compare $I_D$ with $I_{LIMIT2}$. As shown, if $I_D$ exceeds $I_{LIMIT2}$ at any time in the switching period after $t_{LEB}$, then the output of comparator 605 goes high, causing the output 660 of AND gate 607 to go high setting latch 638.

In the example shown in FIG. 6, a frequency adjuster is realized in accordance with the teachings of the present invention with latch 638 and the FREQ ADJ input of oscillator 640. For one embodiment, when latch 638 is set, oscillator 640 changes from a higher frequency to a lower frequency, which effectively delays the start of the next switching period in accordance with the teachings of the present invention. For one embodiment, oscillator 640 is configured such that setting latch 638 and thereby activating the FREQ ADJ input of oscillator 640 causes the next pulse of the drive signal to be skipped, which effectively causes the frequency of oscillator 640 to be reduced in accordance with the teachings of the present invention. In the illustrated example, latch 638 is reset at the start of the next switching period by the CLOCK signal 644.

In the foregoing detailed description, the methods and apparatuses of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A switching regulator circuit, comprising:
   a switch to be coupled to an energy transfer element;
   a controller coupled to the switch to control switching of the switch to regulate an output of a power supply in response to a feedback signal;
   a current sensor included in the controller and including first and second comparators coupled to compare a current in the switch with first and second current limits, respectively, the controller to open the switch for a remainder of a current switching cycle of the switch until a next switching cycle of the switch if the current in the switch is greater than the first current limit, wherein the first and second comparators are coupled to compare the current in the switch with their respective current limits independent of the feedback signal; and
   a frequency adjuster included in the controller and coupled to the second comparator, the frequency adjuster to adjust an oscillating frequency of an oscillator included in the controller, wherein the frequency adjustor is coupled to adjust the oscillating frequency by delaying the next switching cycle of the switch by a first amount of time if the current in the switch is greater than the second current limit and by delaying the next switching cycle of the switch by a second amount of time if the current in the switch is greater than the second current limit for a second consecutive switching cycle, wherein the second amount of time is different than the first amount of time.

2. The switching regulator of claim 1 wherein the frequency adjuster is to reduce the oscillating frequency of the oscillator to delay the next switching cycle of the switch in response to the second comparator.

3. The switching regulator of claim 1 wherein the frequency adjuster is to reduce the oscillating frequency of the oscillator to skip the next switching cycle of the switch in response to the second comparator.

4. The switching regulator of claim 1 wherein the controller is included in an integrated circuit.

5. The switching regulator of claim 4 wherein the switch is included in the integrated circuit.

6. The switching regulator of claim 1 wherein the second current limit is greater than the first current limit.

7. The switching regulator of claim 1 further comprising a leading edge blanking circuit included in the controller and coupled to the current sensor.

8. The switching regulator of claim 1 wherein the frequency adjuster is to adjust the oscillating frequency of the oscillator to provide uninterrupted regulation at an output coupled to the energy transfer element.

9. The switching regulator of claim 1 wherein the controller is further to open the switch for the remainder of the current switching cycle of the switch until the next switching cycle of the switch if the current in the switch is greater than the second current limit.

10. A method for regulating a transfer of energy, comprising:
    switching a switch coupled to an energy transfer element to regulate a transfer of energy through the energy transfer element in response to a feedback signal;
    comparing a current in the switch with a first current limit independent of the feedback signal;
    comparing the current in the switch with a second current limit independent of the feedback signal;
    opening the switch for a remainder of a current switching cycle of the switch until a next switching cycle of the switch if the current in the switch is greater than the first or second current limit;
    delaying the next switching cycle of the switch by a first amount of time if the current in the switch is greater than the second current limit; and
    delaying the next switching cycle of the switch by a second amount of time if the current in the switch is greater than the second current limit for a second consecutive switching cycle, wherein the second amount of time is different than the first amount of time.

11. The method for regulating the transfer of energy of claim 10 wherein delaying the next switching cycle of the switch comprises adjusting a frequency of an oscillator if the current in the switch is greater than the second current limit.

12. The method for regulating the transfer of energy of claim 10 wherein delaying the next switching cycle of the switch comprises skipping the next switching cycle of the switch if the current in the switch is greater than the second current limit.

13. The method for regulating the transfer of energy of claim 10 wherein the second current limit is greater than the first current limit.

14. The method for regulating the transfer of energy of claim 10 further comprising ignoring the current through the switch during a leading edge blanking time of each switching cycle of the switch.

15. The method for regulating the transfer of energy of claim 10 wherein the delaying of the next switching cycle comprises maintaining uninterrupted regulation of an output coupled to the energy transfer element.

16. A power supply, comprising:
    an energy transfer element coupled between an input and an output of the power supply;
    a switch coupled to the input of the energy transfer element to regulate a transfer of energy from the input of the power supply to the output of the power supply in response to a feedback signal;
    a controller coupled to the switch to control switching of the switch;
    a current sensor included in the controller and including first and second comparators coupled to compare a current in the switch with first and second current limits, respectively, the controller to open the switch for a remainder of a current switching cycle of the switch until a next switching cycle of the switch if the current in the switch is greater than the first current limit, wherein the first and second comparators are coupled to compare the current in the switch with their respective current limits independent of the feedback signal; and a frequency adjuster included in the controller and coupled to the second comparator, the frequency adjuster to adjust an oscillating frequency of an oscillator included in the controller, wherein the frequency adjustor is coupled to adjust the oscillating frequency by delaying the next switching cycle of the switch by a first amount of time if the current in the switch is greater than the second current limit and by delaying the next switching cycle of the switch by a second amount of time if the current in the switch is greater than the second current limit for a second consecutive switching cycle, wherein the second amount of time is different than the first amount of time.

17. The power supply of claim 16 further comprising a feedback circuit coupled between the output of the power supply and the controller to provide the feedback signal from the output of the power supply to the controller.

18. The power supply of claim 16 further comprising an integrated circuit including the controller.

19. The power supply of claim 18 wherein the integrated circuit further comprises the switch.

20. The power supply of claim 16 wherein the second current limit is greater than the first current limit.

21. The power supply of claim 16 wherein the frequency adjuster is to adjust the oscillating frequency of the oscillator to provide uninterrupted regulation at the output of the power supply.

22. The switching regulator of claim 16, wherein the frequency adjuster comprises a latch coupled between the second comparator and a frequency adjust input of the oscillator, wherein the latch is set in response to the second comparator detecting that the current in the switch is greater than the second current limit.

23. The switching regulator of claim 22, wherein the latch is coupled to a clock output of the oscillator and wherein the latch is reset in response to a non-lengthened switching cycle of the switch.

* * * * *

UNITED STATES PATENT AND TRADEMARK OFFICE
CERTIFICATE OF CORRECTION

| | | |
|---|---|---|
| PATENT NO. | : 7,613,019 B2 | Page 1 of 1 |
| APPLICATION NO. | : 11/177096 | |
| DATED | : November 3, 2009 | |
| INVENTOR(S) | : Derek J. Kroes | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Nineteenth Day of October, 2010

David J. Kappos
*Director of the United States Patent and Trademark Office*